UNITED STATES PATENT OFFICE.

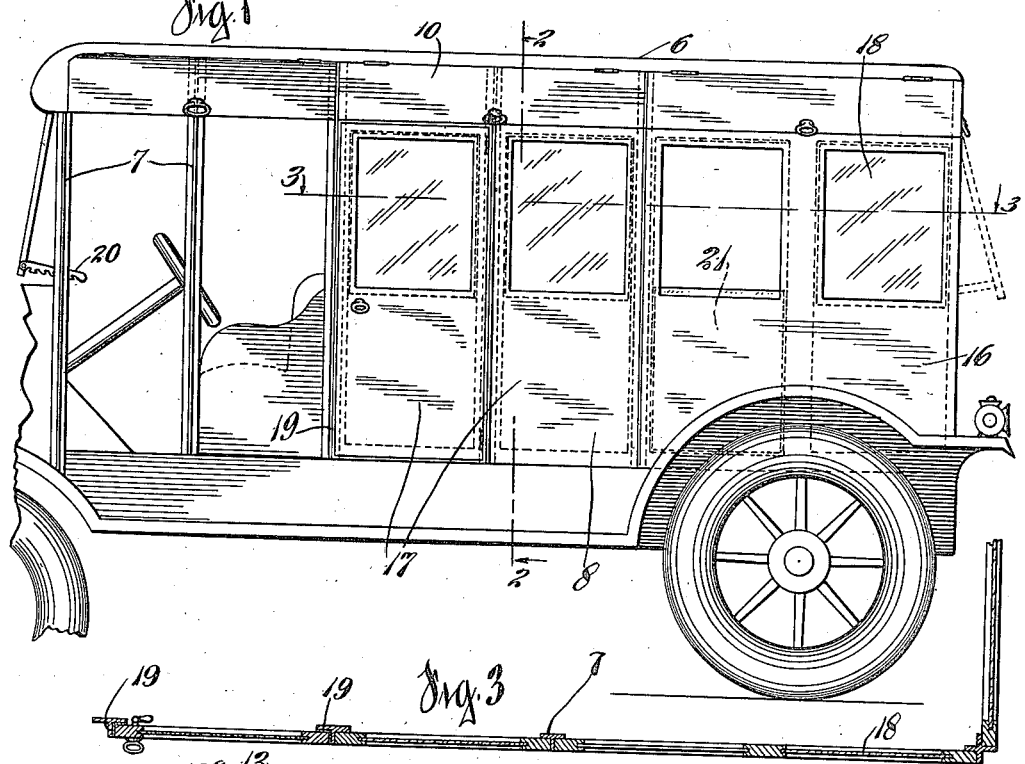
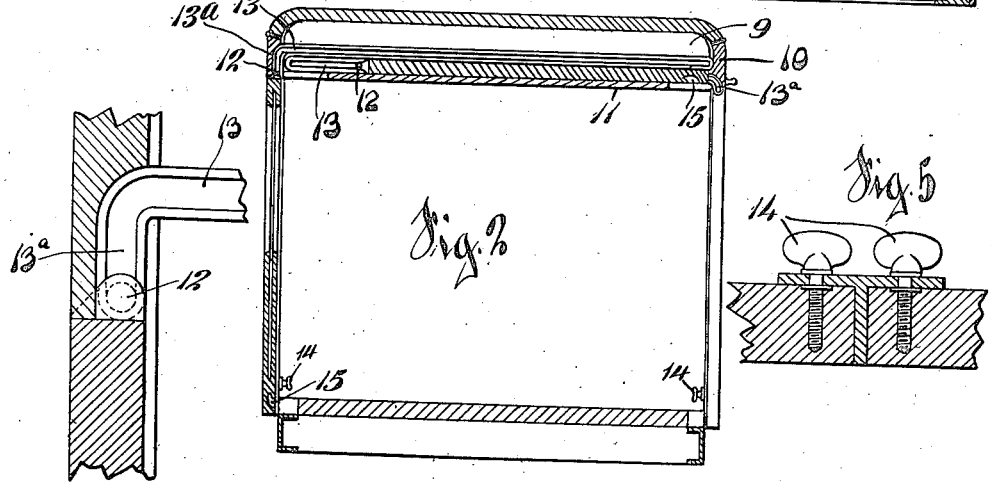
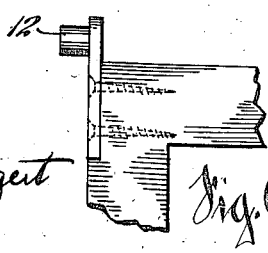

WILLIAM B. GOODWIN, OF COLUMBUS, OHIO.

VEHICLE-TOP.

1,204,008.

Specification of Letters Patent.

Patented Nov. 7, 1916.

Application filed May 11, 1914. Serial No. 837,657.

*To all whom it may concern:*

Be it known that I, WILLIAM B. GOODWIN, a citizen of the United States of America, and resident of Columbus, county of Franklin, and State of Ohio, have invented certain new and useful Improvements in Vehicle-Tops, of which the following is a specification.

This invention relates to improvements in means for inclosing vehicles, and has for an object to produce a vehicle top in which means are provided for carrying a series of paneled side members in a compact, concealed and at the same time a readily accessible position.

A further object is to produce a vehicle top in which the side inclosing panels may be readily changed for summer or winter use.

These and other objects are obtained in the device described in the following specification and illustrated in the accompanying drawings in which:

Figure 1, is a side elevation of a vehicle having a top and sides embodying my invention, mounted thereon. Fig. 2, is a sectional view taken on the line 2—2 of Fig. 1. Fig. 3, is a fragmental sectional view taken on the line 3—3 of Fig. 1. Fig. 4, is a fragmental sectional view of a panel-mounting detail of my invention. Fig. 5, is a fragmental sectional view of a panel-securing detail of my invention and Fig. 6, is a fragmental view of a panel, showing a panel mounting means secured thereto.

The device consists of a top or roof portion 6, suitably supported above the body of the vehicle by means of upright support members 7 and a series of side inclosing panels 8, adapted to be mounted between the support members to inclose the vehicle and to be placed within compartments 9, formed in the roof when it is desired. Doors 10 are provided on either side of the roof in order to close the compartments to hold the sides therein and to prevent dust or moisture from entering. These doors are hinged to the roof proper and are secured by suitable catches or locks to the sub-roof 11 which forms the ceiling of the vehicle. Similar doors are placed at each end of the top in order to close compartments into which the end panels of the vehicle are placed. The support members 7 are preferably formed of T iron so that the panels may be secured in the angles of the T as shown in Fig. 3.

At each corner of the top a support of cross-shaped cross section is provided in order to form angles into which the side and end panel may be secured as shown in Fig. 3. At their tops, the sides have outwardly projecting pins 12 which are adapted to engage the lower ends 13ª of ways 13, provided for slidingly mounting the pins 12 and at the bottom of the sides some convenient fastening device such as thumb screws 14, Fig. 5, are provided. These thumb screws are mounted in the flanges of the support members near the bottoms of the panels, with the heads thereof extending inwardly so that the panels may be easily locked in position from the interior of the vehicle. The ways 13 are mounted upon partitions extending from side to side of the vehicle and are located between the roof and ceiling of the top, between adjacent compartments. These ways are provided for the purpose of guiding the sides when it is desired to place them in the compartments. The panels of one side of the vehicle are adapted to slide in ways which are adjacent to the ceiling thereof and the panels of the other side of the vehicle are adapted to slide in ways located above the ways of the first mentioned side, so that the first mentioned panels will lie adjacent to the ceiling 11 and the opposite panels will lie upon the first mentioned panels when they are stored in the compartments. Recesses 15 are formed in each panel in order to provide means for more easily removing the panels from the compartments and to draw the lower ends of the panels toward the flanges of the support members when it is desired to lock them in place by means of the thumb screws 14. The panels may be so formed that they are made in double sections 16, as shown in Fig. 1, or they may be made in single sections 17. These sections may be provided with windows 18, which may be made to be raised or lowered in order to provide for ventilation or to convert the vehicle into one of the semi-inclosed type. In order to provide for hinged doors I have shown one of the panels mounted in a separate angle-iron frame 19. This frame is adapted to slide in one of the ways 13 at its upper end and to be secured at its lower end to the support members in a manner similar to that shown in Fig. 5. The hinges of the door are of course secured to the angle-iron frame as shown in Fig. 1 and the door lock or catch is so arranged that the free edge of the door may be secured to the angle-iron frame in the usual manner. In moving the door and its mounting frame into position within its compartment, they will move as though they were one piece. The front and back panels are mounted in a manner similar to that of the side panels and may be so arranged that their lower ends may be held away from the supporting members, in order to provide for ventilation if desired. In the drawings I have shown notched bars 20 which permit of any degree of ventilation adjustment of the panels that may be desired.

In the vehicle inclosing means embodying my invention I have provided for changing the panels for summer or winter use. The panels for winter use may be constructed of veneer or light pressed steel in order to make them more substantial and better adapted to be permanently secured in position during the winter. In these panels, glass windows may be mounted and spaces 21 may be formed therein to permit of the dropping of the windows if desired. When the panels are in permanent use during the winter months the compartments in the roof may be used for storage of robes, tires, etc.

The panels to be used during the summer are of much lighter construction than those to be used during the winter and are intended to be carried at all times in the roof compartment in order that they may be readily accessible when needed. They may be constructed of a light wire or steel frame work over which some water proof material is placed, such as rubberized cloth, leather, etc., and windows of thin glass or other transparent material may be placed in the panel material as in ordinary curtain construction. In this summer panel construction, doors may be provided for, in a manner similar to that of the doors of winter panels.

In use; the doors 10 are raised without leaving the vehicle and by reaching into the compartment the panels are withdrawn. In withdrawing the panels, they are moved outwardly to positions at right angles to the sides of the vehicle till the mounting pins 12 are free to engage the downwardly extending portions 13ᵃ of the slide 13, then the panels are permitted to fall toward the sides of the vehicle in order to enable the person in the vehicle to draw their lower ends inwardly by means of the recesses 15, in order to secure them in position by means of the fastening devices 14. In raising the side panels to again place them in their respective compartments, the fastening devices 14 are loosened and the panels are pushed outwardly, swinging upon their pins 12 as pivots, until they occupy positions at right angles to the sides of the vehicle. Pins 12 are now moved upwardly to occupy the horizontal portions of the ways 13, and the panels are then drawn into their respective compartments. Doors 10 may be provided with spring hinges which operate to hold them open or closed during the panel removing and replacing operation, or they may be provided with ordinary hinges in order to allow them to fall by gravity if desired.

In removing the winter panels, they are first raised to a horizontal position and then one side of the panel is lifted until one of its pins 12 is freed from its mounting way 13, thus enabling the operator to remove the other pin and to thereby remove the entire panel. In placing the summer panels in position, an operation the reverse of that just described, is carried out.

It will be seen that by providing a vehicle top with a series of removable sides or panels and by so constructing the top that the panels may be easily stored and carried in a protected and inconspicuous manner, one vehicle may be adapted to be used during the winter as well as the summer and that therefore the necessity of having separate vehicles for winter and summer use is eliminated. Furthermore, summer panels embodying my invention are much more easily and quickly placed in position than are the folded or rolled vehicle curtains now used and they are lighter and stronger than such curtains. The particular manner of storing the panels in compartments formed in the roof of the vehicle top is also advantageous since they are protected from dust, moisture, or other destructive agents and are carried at all times in a convenient, compact and sightly manner.

Having thus described my invention what I claim is:

1. In a vehicle top the combination of a double roof, partitions extending transversely of the roof and dividing it into a series of panel holding compartments, rigid panels extending the full height of the vehicle body and adapted either to close the sides of the vehicle or to occupy the compartments, ways provided on the partitions for slidingly mounting the panels in the compartments so that the panels of one side of the vehicle will occupy a position above the panels of the other side of the vehicle, rigid doors adapted to close the compartments, and flanged roof support members the panels being adapted to be secured to the flanges of the support members when in operative position.

2. In combination in a vehicle body, a double roof having compartments formed therein and open at opposite sides, supports adapted to support the roof, rigid panels extending the full height of the vehicle body and removably mounted on the supports, ways provided in the roof adapted to slidingly mount the panels, said ways having downturned ends adapted to hold the upper ends of the panels in position against the supports, rigid doors adapted to close the open sides of the compartments, and flanged roof support members, the panels being adapted to be secured to the flanges of the support members when in operative position.

In testimony whereof, I have hereunto subscribed my name this 7th day of May, 1914.

WILLIAM B. GOODWIN.

Witnesses:
WALTER F. MURRAY,
W. THORNTON BOGERT.